United States Patent [19]

Bayha

[11] 4,447,577

[45] May 8, 1984

[54] EMULSIONS OF DICYCLOPENTADIENE CONTAINING POLYESTERS

[75] Inventor: Charles E. Bayha, Collierville, Tenn.

[73] Assignee: Alpha Corporation of Tennessee, Collierville, Tenn.

[21] Appl. No.: 419,773

[22] Filed: Sep. 20, 1982

Related U.S. Application Data

[63] Continuation-in-part of Ser. No. 370,380, Apr. 21, 1982, abandoned.

[51] Int. Cl.³ .............................................. C08L 67/00
[52] U.S. Cl. .................................... 524/845; 524/846; 524/604
[58] Field of Search ....................... 524/845, 846, 604

[56] References Cited

U.S. PATENT DOCUMENTS

| | | | |
|---|---|---|---|
| 4,303,567 | 12/1981 | Frank et al. .......................... | 524/604 |
| 4,377,663 | 3/1983 | Wakabayashi ......................... | 525/64 |

FOREIGN PATENT DOCUMENTS

| | | | |
|---|---|---|---|
| 54-114018 | 9/1979 | Japan . | |
| 55-89316 | 7/1980 | Japan ................................... | 524/604 |
| 7604663 | 11/1977 | Netherlands ......................... | 524/604 |
| 615097 | 7/1978 | U.S.S.R. .............................. | 524/604 |

Primary Examiner—Joseph L. Schofer
Assistant Examiner—N. Sarofim
Attorney, Agent, or Firm—Lyon & Lyon

[57] ABSTRACT

Polyesters containing significant amounts of dicyclopentadiene are produced and used in emulsion form. Superior physical properties, including low linear shrinkage, are obtained.

10 Claims, No Drawings

EMULSIONS OF DICYCLOPENTADIENE CONTAINING POLYESTERS

This is a continuation-in-part of my application Ser. No. 370,380, filed Apr. 21, 1982, now abandoned which is incorporated herein by reference.

BACKGROUND OF THE INVENTION

Polyesters have many diverse applications. One application of polyesters is to prepare emulsion compositions used to fabricate casted articles. Another application is in forming laminates containing the polyester.

Use of polyesters to form emulsions has presented several problems. High viscosity, high molecular weight polyesters were used to form the emulsions. Those high molecular weight polyesters often resulted in brittle, weak products. Moreover, the emulsions were difficult to make, because if polyester emulsion formation was viable at all, stability and longevity were minimal.

SUMMARY OF THE INVENTION

The invention is directed to emulsions of polyesters formed from dicyclopentadiene, to production of the emulsions, and to uses of the emulsions. These emulsions can contain high amounts of water, up to 75 or 80% by weight. Moreover, use of an emulsifying agent is optional, that is, no emulsifying agent is necessary in producing the emulsion. The emulsions are stable and long-lived. With respect to fillers, the emulsions exhibit excellent wet out properties, that is, faster and more complete wet out than emulsions of conventional polyesters. This superior wet out property allows for ease of fabrication. Moreover, these emulsions exhibit high loading capabilities, with respect to fillers; this characteristic results in overall cost reduction in fabrication of molded polyester articles. Use of the emulsion in forming laminates results in tougher and more resilient laminates than those in which emulsions of conventional polyesters have been used. Castings of these emulsions exhibit low linear shrink values.

Polyesters used to make the emulsions contain units of the dicyclopentadiene moeity and are characterized by good corrosion resistance and fire retardance. These polyesters can be of either low or high viscosity, and of either low or high molecular weight. These polyesters will air cure and cure on exposure to ultraviolet light.

The polyesters are formed from dicyclopentadiene, maleic acid or maleic anhydride, and a compound which contains at least one alcoholic hydroxyl group and which may be an alcohol, a glycol, or a polyol having at least three alcoholic hydroxyl groups or mixtures thereof.

Emulsions of the invention are readily formed from these polyesters by admixing the polyesters with water, optionally in the presence of emulsifying agents. Optionally, fillers may be present in amounts up to 50% by weight of the emulsion. The emulsions of the invention are very stable, and are suitable for spray applications, and for molding.

DETAILED DESCRIPTION OF THE INVENTION

Emulsions of the invention contain 50 to 80 weight percent water and 5 to 80 weight percent of a polyester which is formed from dicyclopentadiene. The polyesters, described below along with procedures for making them, preferably contain at least one mole of maleic acid for each mole of dicyclopentadiene. Depending on process conditions, these preferred polyesters may exhibit either low or high Gardner Holt viscosity, and either low or high molecular weight. The emulsion is formed by admixing water into the polyester, optionally in the presence of emulsifying agents; that is, emulsions of the invention can be made with or without emulsifying agents. Typically, the emulsions will contain 0 to 5 weight percent emulsifying agents.

The emulsions may also contain other components, in addition to the polyester and the optional emulsifying agent. For example, the emulsions may contain fillers such as glass, fiberglass, calcium carbonate, and alumina trihydrate. Fillers may be present in the emulsion in amounts ranging up to about 50% by weight of the emulsion. One preferred emulsion formulation contains 33% water, 33% polyester, and 33% filler, and another preferred filled emulsion contains 44% water, 44% resin, and 12% filler. Fillers are generally added to the polyester and water prior to emulsification. In the absence of fillers, the emulsions will preferably contain about equal weights of polyester and water.

The emulsion of the invention can contain a curing agent for the polyester and a cross-linking agent. Preferably, the curing agent is a water-soluble compound such as methyl ethyl ketone peroxide, commercially available from Lucedol as Lupersol DWS-9. The stage and mode of curing catalyst addition will depend on the manner in which the emulsion will be used; for example, when the emulsion is to be applied by a conventional laminating spray gun, the curing catalyst is added to the emulsion at the gun head. Unlike phthalic based polyesters, emulsions based on dicyclopentadiene may be catalyzed with water insoluble catalysts.

Although the cross-linking agent may be any compound effective to cross-link the polyester described below, the preferred cross-linking agent is styrene. The cross-linking agent may be present in amounts ranging from about 35% to about 70% by weight based on the polyester weight. With the higher amounts of cross-linking agent, there is an increase in the polymer weight, while at lower amounts of cross-linking agent, the cross-linked polymer exhibits less shrinkage. Generally, amounts of about 50% by weight of cross-linking agent are employed. The emulsion can be formulated to contain conventional antioxidants, inhibitors, and promoters.

The emulsion can be molded to form structures or can be used to reinforce blow-molded structures. The emulsions of the invention will air-cure and exhibit good green strength. Accordingly, the emulsion can be cast by placing it in a mold and allowing it to air-cure with or without heating. After the air cure, the polymer can optionally be dried; drying can be undertaken for example at 110° C. for about 12 hours, preferably followed by treatment in a microwave oven for 20 minutes. The emulsion can also be used to reinforce blow-molded structures, for example, modular acrylic shower or tub installations. Depending on the affinity and adhesion of the emulsion for the material of the blow-molded structure, an intermediate skin between the emulsion layer and the blow-molded structure layer may be employed.

The polyesters used in the compositions of the present invention are produced in a two-stage process. In the first stage, the preparation of an intermediate or adduct which is a reaction product containing dicyclopentadiene and maleic acid or maleic anhydride is undertaken. During the second stage, polymer formation, molecular weight buildup and esterification are effected. Both stages of the process are undertaken under inert conditions. The term "inert conditions" refers to the absence of oxygen. Practically, inert conditions may be obtained by flushing the reaction system with nitrogen, either alone or admixed with carbon dioxide.

During the first stage of the polyester manufacturing process, maleic acid or maleic anhydride is reacted with dicyclopentadiene to produce an intermediate containing dicyclopentadiene and maleic moieties. The product of the first stage may be considered an intermediate, which may contain dicyclopentadiene moieties in the backbone of said intermediate. In the experiments reported below, the maleic acid was generated in situ. In these experiments, the maleic acid was generated by hydrolytic conversion of maleic anhydride to maleic acid, by reacting substantially equimolar amounts of maleic anhydride and water at temperatures ranging from about 60° to about 80° C. Because of the physical properties of maleic anhydride and maleic acid, the hydrolic conversion of maleic anhydride to maleic acid is preferably undertaken in the presence of a heat transfer agent. The heat transfer agent is preferably a glycol, such as one which may be used in esterification in the second stage of the process. Other heat transfer agents which may be used include dicyclopentadiene, or even a solvent such as toluene.

The maleic acid is reacted with dicyclopentadiene at elevated temperatures, discussed below, optionally in the presence of a catalyst under the previously described inert conditions. No catalyst is necessary if the dicyclopentadiene is present during maleic acid production. The molar ratio of maleic acid to dicyclopentadiene may range from 0.5 to 4.0. It is noted that the molar ratio of these reactants controls their content in the polyester product. Thus if the molar ratio of the reactants is about 1:1, the polyester product will contain dicyclopentadiene and maleic acid units in a ratio of about 1:1.

The elevated temperatures of the reaction mixture are high enough to obtain the intermediate, but low enough to avoid cracking dicyclopentadiene, and to avoid isomerization of maleic acid to fumaric acid. Thus the reaction mixture is substantially free of fumaric acid throughout the first stage of the process. The reaction mixture is also substantially free of cyclopentadiene throughout the first stage of the process. At ambient pressure, under which all experiments have been undertaken, it has been found that at temperatures of about 130° C. or greater, fumaric acid is produced, and that at temperatures of 140° C. or greater, dicyclopentadiene is cracked into two moles of cyclopentadiene. With regard to minimum temperatures, it has been found that at temperatures of about 90° C. or less, yields of the intermediate are reduced. Accordingly, in producing polyesters used in the compositions of the present invention, in the first stage of the process, the reaction mixture containing dicyclopentadiene and maleic acid should be heated to temperatures from about 100° to about 120° C.

Because of the temperature requirements of the second stage of the process, the intermediate produced in the first stage of the process should contain less than about 2% unreacted dicyclopentadiene, based on total charge. In the second stage of the process, the elevated temperature conditions could result in the cracking of remaining dicyclopentadiene. It is intended to maximize the dicyclopentadiene content of the polyesters used in the compositions of the present invention. It is therefore desirable to minimize unwanted production of cyclopentadiene, by reducing the amount of unreacted dicyclopentadiene in the intermediate to less than about 2%. In this manner, cracking of dicyclopentadiene in the second stage of the process is substantially eliminated.

Accordingly, in an embodiment of the invention, the time for reaction in the first stage of the process to produce polyester used in the compositions of the present invention is controlled to insure that only less than about 2% dicyclopentadiene remains in the reaction mixture. The time period for reaction in the first stage of the process will vary, depending on whether the reaction between dicyclopentadiene and maleic acid is undertaken in the presence of absence of a catalyst. In the absence of a catalyst, the reaction between dicyclopentadiene and maleic acid to reduce the amount of dicyclopentadiene to less than about 2%, will occur in a time period ranging from about 4 to about 8 hours.

In the presence of a catalyst, the time period for the reaction of the first stage is reduced, and the amount of dicyclopentadiene consumed is increased, compared to the comparable reaction undertaken without a catalyst. Thus, in the presence of a catalyst, the reaction time may be reduced to about 2 hours, and the dicyclopentadiene remaining in the reaction mixture may be reduced to less than about 0.5%.

The catalysts which may be used in the first stage of the process include boric acid/oxalic acid, methane sulfonic acid, boron trifluoride etherate, p-toluene sulfonic acid, arsenic pentoxide, potassium bisulfate, phosphorus pentaoxide, ascorbic acid/benzoic acid, stannous octoate, zinc chloride, stannous chloride, manganese acetate, zinc acetate, "Filtrol Grade 1" by Filtrol Corporation, "Fascat 4100" or "Fascat 4201" from M & T Corporation, and "Tyzor TE" or "Tyzor AA" or "Tyzor OG" organic titanates from E.I. duPont. The preferred catalyst comprises boric acid and oxalic acid in an admixture of 500/500 ppm based on the solids.

The first stage reaction between maleic acid and dicyclopentadiene under the foregoing conditions will produce an intermediate product or adduct which contains dicyclopentadiene and maleic acid, and which contains at least one free carboxylic acid group. Polymerization and esterification of the intermediate under the conditions described below produces the polyesters used in the compositions of the present invention.

In addition to maleic acid, additional acids may optionally be used to form the polyesters used in the compositions of the present invention. Examples of additional acids which may be used to form the polyesters include adipic acid, phthalic acid, isophthalic acid, terephthalic acid, methyl ester derivatives of these acids, and mixtures thereof.

After the first stage reaction has been completed, so that the reaction mixture contains less than about 2% unreacted dicyclopentadiene, the second stage of the two-stage process occurs. During the second stage of the polyester manufacturing process polymerization and polyesterification of the first stage immediate is undertaken in the presence of a compound containing at least one alcoholic hydroxy group. Preferably the polymerization and polyesterification of the first stage intermediate is undertaken in the presence of a compound containing at least two alcoholic hydroxy groups, such as glycol or a polyol containing three or more hydroxy groups. Alcoholic hydroxy group-containing compounds useful in the second stage of the polyester manufacturing process may be any of those conventionally employed in the production of polyesters, such as neopentyl glycol or trimethyl propane diol, cyclohexane dimethanol, dipropylene glycol, tripropylene glycol, tetradipropylene glycol, triethylene glycol, tetraethylene glycol, hexanediol, butanediol, and other straight chain diols, propylene glycol, diethylene glycol, and mixtures thereof.

Preferred alcoholic hydroxy group-containing compounds are propylene glycol, and diethylene glycol. Polyesters formed from propylene glycol form extremely stable emulsions. Diethylene glycol may be used in polyesters of low molecular weight ranging from about 1500 to about 2000, of excellent wet out capacity, and of excellent flexibility. The molar amount of, for example, the glycol which is used in the second stage is about equal to:

$$(\text{moles of maleic acid}) - \frac{(\text{moles of dicyclopentadiene})}{2}$$

This molar amount of glycol used in the second stage includes any glycol which may have been used as a heat transfer agent in the hydrolic conversion of maleic anhydride to maleic acid in the first stage of the process to produce polyester used in the compositions of the present invention.

The temperature of the polymerization and polyesterification in the second stage can range from about 190° C. to about 230° C. Preferably the temperature in the second stage is about 200° C. Heating in the second stage is continued until the reaction mixture exhibits a Gardner Holt viscosity of at least about D, 60/40 cnt (Methacel solvent). Practically, the reaction mixture is heated at about 190° C. to about 230° C. for a period of time ranging from about 6 hours to about 8 hours. The polyesters produced under these conditions are characterized by molecular weights of about 1200 to about 3000, and by acid numbers of less than about 30. The polymers produced exhibit Gardner Holt viscosities ranging from D to T, at 60/40 cnt (Methacel solvent). As previously mentioned, when diethylene glycol is used to produce the polyesters the molecular weight and viscosity of the polymers will be lower than the molecular weight and viscosity of polyesters produced under the same conditions from propylene glycol. Generally, polyesters produced from diethylene glycol will have molecular weights from about 1500 to about 2000.

The dicyclopentadiene content of the polyesters produced by the present process ranges from about 25% to about 50% by weight. When it is indicated that the polyesters used in the compositions of the present invention contain dicyclopentadiene, such reference is meant to encompass both the dicyclopentadiene moiety itself, and also the moiety corresponding to the intermediate produced in the first stage of the process, and also to monomers, dimers, trimers, tetramers, etc., of the dicyclopentadiene moiety and of said maleic acid adduct of dicyclopentadiene.

The examples below illustrate the emulsions of the present invention, and the polyesters used therein. The preparation of the polyesters is first illustrated.

METHOD 1

Two moles of maleic anhydride (196 gms) were charged into a kettle and heated to 70°-80° C. under an inert gas blanket. The kettle was equipped with mechanical stirrer, a vigreux column, and a thermometer. Attached to the column was a water condenser and a claison head with thermometer to monitor head temperature. A jacketed water-cooled receiver was connected to the claison head. Inert gas was monitored by a flow meter and could be introduced into the mixture by either sparge or blanket.

Two moles of water (36 gms) and 0.5 moles of ethylene glycol (31 gms) were slowly added to the kettle, while the kettle temperature was maintained at 90°-100° C. with cooling. At this point, a cook inhibitor may be added, and can be selected from the following compounds: hydroquinone, mono-tert.-butyl hydroquinone, toluhydroquinone, tert-butyl catechol, di-tert-butylhydroquinone, p-benzoquinone, hydroquinone monomethyl ether, 1,4-naphthoquinone, Cyanox 1790 (American Cyanamid), 2,4-di-tert-butyl cresol, and Irganox 1010 (Ciba-Geigy). The preferred inhibitor systems are hydroquinone or m-tert butyl hydroquinone and p-benzoquinone in amounts ranging from about 50–500 ppm based on solids weight. Generally, it is preferred to employ three inhibitors to maintain dicyclopentadiene stable because of its tendency to air-cure. These include the cook catalyst inhibitor, a thinning inhibitor, and a storage inhibitor. A preferred combination includes hydroquinone (a cook catalyst inhibitor), mono-tert.-butyl-hydroquinone (a thinning inhibitor), and benzoquinone, phenylquinone or quinone (storage inhibitor).

After addition of inhibitor, 2 moles of (94% active) dicyclopentadiene (260.8 gms) were slowly added to the kettle which was maintained at temperatures of 90°-100° C. Four different sources of dicyclopentadiene were used: from Exxon Corporation, from Dow Chemical Company, from Chemical Exchange Corporation, and from Shell Chemical.

Purity of the dicyclopentadiene varied from 55–97%. Effective mole weight was estimated by the percent active ingredients in the mixture. Exxon dicyclopentadiene is 100% reactive and therefore the actual and effective mole weight is 132. The other sources vary from 94–97% reactive and the weight of these which is equivalent to one mole of pure and 100% reactive dicyclopentadiene varies from 132.0 to 140.4. Thus, 140.4 gms of a source of dicyclopentadiene which is only 94% reactive, compared to pure dicyclopentadiene, will be required to provide one effective mole of dicyclopentadiene.

After all of the dicyclopentadiene was added over a period of 40 to 60 minutes, the reaction mixture was maintained at 100° C. for one-half hour. The temperature of the reaction mixture was then increased to 120° C. and maintained at 120° C. for two hours.

Analysis of the reaction mixture by gas chromatography revealed the following composition:

| a. | unreacted maleic anhydride | 18–22% |
|---|---|---|
| b. | dicyclopentadiene (unreacted) | 2–3% |
| c. | maleic anhydride/dicyclopentadiene adduct | 65–70% |
| d. | high molecular weight products | 5–10% |

When dicyclopentadiene from Exxon or Dow is employed, it is preferable to add the cook inhibitor(s) at this point. The cook catalyst(s) can be added at this point to increase the amount of dicyclopentadiene consumed and to shorten cycle time of cook. The preferred catalyst system is boric acid/oxalic acid at 500/500 ppm based on solids.

Propylene glycol (0.5 moles, 45.6 gms) was then added to the reaction vessel. The reaction mass was heated to 200°–220° C., during which time distillate was removed. All of the water initially charged is removed, plus 2–2.5% by total solids wt. extra water. Loss of unreacted dicyclopentadiene with catalyst is 2–4% (by dicyclopentadiene charge wt.); loss without catalyst, 5–7% (by dicyclopentadiene charge wt.). The reaction was allowed to continue until the acid number was less than 30 and Gardner Holt viscosity at 60% solids and 40% methocel solvent was E-F. At this point, the mixture was cooled to 160°–170° C. and thinned in 30% by weight styrene stabilized with 100 ppm meta-tert-butyl hydroquinone.

METHOD 2

Two moles of maleic anhydride (196 gms) were charged into a kettle similarly equipped as in Method 1. It was heated to 70°–80° C. Dicyclopentadiene (Dow Chemical) (2 moles; 94% active—280.8 gms) was charged into the kettle which was heated to maintain a temperature at 70°–80° C.

Water (2.25 moles or 40.5 gms) was slowly added at a temperature between 80°–100° C., maintained by cooling. After all the water was added, the whole was heated at 100°–110° C. for half an hour. It was then heated to 120° C. and held for two hours. Analysis (gas chromatograph) indicated the following mixture:

| a. | unreacted maleic anhydride | 12–18% |
|---|---|---|
| b. | unreacted dicyclopentadiene | 0.5% |
| c. | dicyclopentadiene/maleic acid adduct | 73.80% |
| d. | higher molecular weights | 2–5% |

Hydroquinone (100 ppm based on solids charge), as an inhibitor, was added at this time. No cook catalyst was added.

Propylene glycol (0.5 moles, 45.6 gms) and ethylene glycol (0.5 moles, 31.0 gm) were also added at the same time as the hydroquinone.

The reaction mixture was heated at 200°–220° C. until the acid number was less than 30 and Gardner Holt viscosity at 60% solids and 40% methocel was E-F. The reaction mixture was cooled and thinned as in Method 1.

METHOD 3

Two moles of maleic anhydride (196 gms) were charged into a kettle similarly equipped as in Method 1. It was heated to 70°–80° C. Dicyclopentadiene (1.0 mole; 94% active—140.4 gms) from Dow Chemical was added at a temperature maintained at 70°–80° C. with heating.

Water (1.60 moles or 28.8 gms) was slowly added at a temperature of between 80°–100° C. maintained by cooling. After all the water was added, the mixture was heated to 100°–110° C. and held at that temperature for one-half hour. It was then heated to 120° C. and held at the elevated temperature for two hours. Gas chromatography indicated less than 0.1% free dicyclopentadiene.

Hydroquinone (100 ppm based on solids charge), was added as an inhibitor at this time. No cook catalyst was added. Propylene glycol (1.6 moles, 121.6 gms) was also added.

This mixture was heated at 200°–220° C. until the acid number was less than 30 and Gardner Holt viscosity at 60% solids and 40% methocel was E-F. The reaction mixture was cooled and thinned as in Method 1.

METHOD 4

Two moles of maleic anhydride, 196 gms, were charged into a kettle similarly equipped as in Method 1. It was heated to 70°–80° C.

Water (1.60 moles—28.8 gms) was then slowly added to the maleic reactant which was then maintained at temperatures of between 80°–100° C. with cooling. After all the water was added, the mixture was heated to 100° C.

Dicyclopentadiene (1.0 moles, 94% active—140.4 gms) from Dow Chemical Company was slowly added to the mixture which was maintained at a temperature between 80° and 100° C. After a hold period of 100° C. for half an hour, the mass was heated to 120° C. and maintained at 120° C. for two hours.

Gas chromatography analysis indicated 0.5% free dicyclopentadiene. Hydroquinone (100 ppm based on solids charge), was added as an inhibitor at this time. No cook catalyst was added. Propylene glycol (1.6 moles, 121.6 gms) was added. The final resin was prepared in the same manner as in Method 3.

METHOD 5

Two moles of maleic anhydride (196 gms) were charged into a kettle similarly equipped as in Method 1. The kettle was heated to 70°–80° C.

Water (1.60 moles—28.8 gms) was slowly added while maintaining a temperature between 80°–100° C. with cooling. After all the water was added, the kettle was heated to 100° C.

Dicyclopentadiene from Dow Chemical Co. (1.0 moles, 94% active, 140.4 gms) was slowly added at a temperature maintained between 80° and 100° C. After the addition was complete, the mass was held at 100° C. for half an hour. The temperature was then raised to 120° C. and maintained for two hours.

Hydroquinone (100 ppm based on solids charge), was added as an inhibitor at this time. No cook catalyst was added. Diethylene glycol (1.6 moles or 169.6 gm) was added to the mass. The resin was prepared in a similar manner as in Method 3.

Resins prepared according to this method are of low viscosity and low molecular weight ranging from 1500 to 2000 and exhibit excellent glass filler wet-out properties.

METHOD 6

Two moles of maleic anhydride (196 gms) were charged into a kettle similarly equipped as in Method 1. The kettle was heated to 70°–80° C.

A mixture of water (2.00 moles, 36.0 gms) and diethylene glycol (0.25 moles, 26.5 gms) was slowly added while the temperature of the kettle contents was maintained below 100° C. with cooling.

Dicyclopentadiene from Dow Chemical Col (2.00 moles; 94% active, 280.8 gms) was slowly added to the kettle at a temperature between 80° and 100° C. After half an hour hold period, the mass was heated to 120° C. and maintained for two hours. Gas chromatography analysis indicated 3% unreacted dicyclopentadiene.

Hydroquinone (100 ppm based on solids charge), was added to the cook. No cook catalyst was added.

Diethylene glycol (1.35 moles or 143.1 gms) was added to the cook.

The resin was prepared in a similar manner as with Method 3.

METHOD 7

Two moles of maleic anhydride, 196 gms, were charged into a kettle similarly equipped as in Method 1. The mixture was heated to 70°–80° C.

Water (1.60 moles, 28.8 gms) and diethylene glycol (0.25 moles, 26.5 gms) was slowly added to the molten maleic anhydride maintained at a temperature between 80° and 100° C. with cooling.

Dicyclopentadiene (1.00 mole, 94% active, 140.8 gms) was slowly added to the mixture at a temperature below 100° C. After half an hour, the temperature was raised to 120° C. and maintained at 120° C. for two hours. Gas chromatography indicated less than 4% free dicyclopentadiene.

Hydroquinone (100 ppm based on solids charged), was then added as an inhibitor.

Diethylene glycol, 0.75 moles (79.5 grams), was then added.

The whole was allowed to react in an inert gas atmosphere at 200°–220° C. until the acid number of the reaction mixture was less than 50. The reaction mixture was then placed on inert gas sparge and heated until Gardner Holt viscosity in 60% solids/40% methocel was G-H. The temperature was then decreased to 180°–190° C. and inert gas sparging continued. When the viscosity reached an R-S and an acid number less than 20, the mixture was cooled to 160° C. and thinned in 30% by weight styrene inhibited with 100 ppm meta-tert-butylhydroquinone.

METHOD 8

Two moles of maleic anhydride (196 gms) and 2 moles of 94% active dicyclopentadiene (280.4 gms) were charged into a kettle similarly equipped as in Method 1. The kettle was heated to 70°–80° C.

Water (2.00 moles, 36.0 gms) and propylene glycol (0.5 moles, 38.8 gms) were slowly added at a temperature maintained between 80° and 100° C. After half an hour at 100°–110° C., the mixture was heated to 120° C. and maintained at 120° C. for two hours. Analysis by gas chromatography indicated less than 1% free dicyclopentadiene in the reaction mixture.

Inhibitor, hydroquinone (100 ppm based on solids charge), was added at this point.

Propylene glycol (0.6 moles, 45.6 gms) was added, and the mixture was heated at 200°–220° C.

Utilizing the same procedure as in Method 7, the cook was cooled and thinned in 100 ppm meta-tert-butylhydroquinone when the acid number decreased to below 20 and the viscosity (Gardner Holt) became R-S.

Resins produced by this method are as stable as those of Method 5. Resins produced by Method 8 are preferred for molding techniques.

Properties of resins made according to the foregoing methods are described in the table entitled THINNED RESIN PROPERTIES.

All values stated in the example do not necessarily reflect actual quantities run either in the laboratory or plant but rather accurately indicate the ratio of values between various reactants.

| | | THINNED RESIN PROPERTIES | | | | | | | |
|---|---|---|---|---|---|---|---|---|---|
| | | Method 1 | Method 2 | Method 3 | Method 4 | Method 5 | Method 6 | Method 7 | Method 8 |
| | % Styrene | 30% | 30% | 30% | 35% | 30% | 30% | 27% | 27% |
| 1. | Color (Gardner) | 4 | 6 | 6 | 3 | 3 | 9 | 8+ | 4 |
| 2. | Sp. Gr. at 25° C. | 1.113 | 1.100 | 1.102 | 1.099 | 1.128 | 1.109 | 1.138 | 1.111 |
| 3. | Viscosity Brookfield, #28, 20 rpm | 1285 cps | 500 cps | 825 cps | 328 cps | 610 cps | 050 cps | 3200 cps | 2975 cps |
| 4. | S.P.I. (10% bro) | | | | | | | | |
| | a. Gel time, min. | 5'40" | 4'25" | 3'45" | 3'18" | 3'58" | 4'22" | 6'18" | 0'35" |
| | b. Peak | 397° F. | 384° F. | 398° F. | 428° F. | 415° C. | 355° F. | 395° F. | 374° F. |
| | c. Cure, min. | 2'50" | 2'33" | 2'38" | 1'48" | 2'00" | 3'0" | 2'6" | 2'55" |
| | d. Total, min. | 8'30" | 6'58" | 6'23" | 5'06" | 5'58" | 7'22" | 8'24" | 9'30" |
| | % Styrene | 40% | 40% | 40% | 40% | 40% | 40% | 40% | 40% |
| 1. | Color (Gardner) | 4 | 5–6 | 5–6 | 2–3 | 4 | 9 | 8+ | 5 |
| 2. | Sp. Gr. at 25° C. | 1.072 | 1.070 | 1,070 | 1.078 | 1.093 | 1.048 | 1.125 | 1.077 |
| 3. | Viscosity, Brookfield, #25, 20 rpm | 125 cps | 75 cps | 115 cps | 150 cps | 150 cps | 350 cps | 360 cps | 340 cps |
| 4. | S.P.I. | | | | | | | | |
| | a. Gel time, min. | 4'20" | 7'25" | 6'15" | 4'30" | 3'59" | 4'25" | 4'48" | 4'15" |
| | b. Peak | 443° F. | 405° F. | 444° F. | 454° F. | 430° F. | 355° F. | 435° F. | 415° F. |
| | c. Cure, min. | 3'42" | 2'45" | 3'30" | 3'20" | 2'06" | 3'15" | 6'42" | 2'15" |
| | d. Total, min. | 8'02" | 10'10" | 9'45" | 7'50" | 6'05" | 8'07" | 11'30" | 6'30" |

EXAMPLE A

In order to form an emulsion of the invention, a resin produced by Method 5 was formulated with the components described below and properties of the resulting formulation were determined as set forth below.

| Formulation | | |
|---|---|---|
| 1. | Resin produced by Method 5 | 69.727 |
| 2. | Styrene | 27.889 |
| 3. | Cobalt octoate[a] (12% active) 12% active | 0.859 |
| 4. | Dimethyl aniline | 0.488 |
| 5. | Zinc stearate | 0.391 |
| 6. | Di-tertiary butyl cresol | 0.020 |
| 7. | Copper naphthenate[b] (12% active) | 0.003 |
| 8. | 1,4 Naphthaquinone | 0.030 |
| 9. | Meta-phenyl ethanol amine | 0.195 |
| 10. | Meta-tert-butyl-hydroquinone | 0.001 |
| 11. | Potassium octoate[c], 18% active | 0.391 |

[a]Mooney Chemical
[b]Mooney Chemical
[c]Mooney Chemical

Properties of Formulated Resin

1. Color: Reddish Purple
2. Specific Gravity at 25° C.: 1.050–1.060
3. Viscosity, Brookfield at 25° C.: 60–100 cps #2 at 20 rpm
4. S.P.I. (1% BPO in 100 p. resin in 160° F. Water Bath)
   a. Gel time: 20'30"
   b. Peak, °F.: 405° F.

Emulsion Procedure

The formulated resin, 44% by wt., is stirred with 44% water until a stable emulsion is formed. Mode of addition is not important. Calcium carbonate (Georgia Pacific), 9.7% by wt., is added to the mix with 2.3% trihydrated alumina. The emulsion is stable for at least about four hours at room temperature. The filled resin system can then be applied by a spray gun equipped to dispense chopped glass externally. Water-soluble catalyst (1% by filled resin wt.) is added at the gun lead. Catalysts include (Lupersol) DWS-9 by Lucedol, or Superox 738 by Reichhold, or W60 by Norac. Water insoluble catalysts can also be employed, and are preferred.

Properties of Filed Resin in 100 gm mix+1% Catalyst, DSW9

| 1. | Viscosity, Brookfield at 25° C., Spindle #2 at 20 rpm | 800 cps |
|---|---|---|
| 2. | Gel time, min. | 4'3" |
|   | Peak | 203° F. |
|   | Cure, min. | 4'0" |
|   | Total, min. | 8'3" |

EXAMPLE B

A resin produced by Method 5 was formulated with the following ingredients:

| Formulation | | |
|---|---|---|
| 1. | Resin of Method 5 | 69.850 |
| 2. | Styrene | 27.950 |
| 3. | Cobalt Octoate | 0.980 |
| 4. | Dimethylaniline | 0.490 |
| 5. | m-phenyl ethanol amine | 0.290 |
| 6. | Zinc stearate | 0.390 |
| 7. | Di-tertiary butyl cresol | 0.020 |
| 8. | Copper naphthenate | 0.003 |
| 9. | 1,4 naphthaquinone | 0.020 |
| 10. | Hydroquinone | 0.005 |

The properties of this formulation were substantially identical to those of the corresponding formulation of Example A.

Emulsion Procedure

The formulated resin (33% by wt.) was stirred with 33% by wt. water until a stable emulsion formed. Mode of addition is not important. Tri-hydrated alumina, 33% by wt. was added to the mix. The emulsion was stable for at least about 4 hours at room temperature. Then procedures of Method 1 were followed to produce a filled resin having the following properties.

Properties of Formulated, Filled Resin (100 gm+1% catalyst)

| 1. | Viscosity, Brookfield at 25° C., Spindle #2 at 20 rpm | 1800–2300 cps |
|---|---|---|
| 2. | S.P.I. Reactivity at 77° F. (1% DSW9) | |
|   | a. Gel time, min. | 3.5–4.0 |
|   | b. Peak | 170° F. ± 5 |
|   | c. Cure, min. | 5.0 ± 2 |
|   | d. Total, min. | 9.0 ± 2 |

EXAMPLE C

The formulation of Example A was processed to form an emulsion as in Example A, except that no filler was employed. Properties of the resulting emulsion were determined and are described below.

Properties of Emulsion Resin (50% Water/50% Resin)

| 1. | Viscosity, Brookfield at 25° C., Spindle #3 at 60 rpm | 435 cps |
|---|---|---|
| 2. | S.P.I. Reactivity at 77° F. (1% DSW9) 100 gm resin/water emulsified | |
|   | a. Gel time | 4'3" |
|   | b. Peak | 210° F. |
|   | c. Cure, min. | 4'3" |
|   | d. Total, min. | 8'6" |
|   | 100 gm Resin (neat) | |
|   | a. Gel time | 0'7" |
|   | b. Peak | 493° F. |
|   | c. Cure, min. | 5'0" |
|   | d. Total, min. | 5'7" |

EXAMPLE D

The resin of Method 1 was formulated in accordance with the procedures of Example B, and the resin formulation exhibited the following properties.

Resin Formulation Properties: (50% Styrene)

| 1. | Amber, clear color | |
|---|---|---|
| 2. | Sp. Gr. at 25° C. | 1.045 |
| 3. | Viscosity, Brookfield at 25° C., #2 Spindel at 20 rpm | 90 cps |
| 4. | Reactivity (100 gm, Resin + 1% DDM Catalyst) | |
|   | a. Gel time | 4'30" |
|   | b. Peak | 370° F. |
|   | c. Cure | 5'0" |
|   | d. Total | 9'30" |

The filled resin emulsion of ⅓ water, ⅓ resin and ⅓ filler, prepared in accordance with Example B, exhibited the following properties:

Formulated, Filled Resin Emulsion Properties

| 1. | Viscosity, Brookfield #2 Spindle at 20 rpm | 1830 cps |
|---|---|---|
| 2. | Reactivity (100 gm resin + 1% DDM-9 catalyst) | |
|   | a. Gel time | 8'0" |
|   | b. Peak | 150° F. |
|   | c. Cure | 17'36" |
|   | d. Total | 25'36" |

EXAMPLE E

This was a control experiment. Firstly, a conventional polyester was formed from the following components:

| 1. | Isophthallic acid | 1.0 mole |
|---|---|---|
| 2. | Propylene glycol | 2.2 moles |
| 3. | Maleic anhydride | 1.0 mole | which were reacted together until the reaction mass exhibited an acid number of less than 20 and a viscosity of T-U (60/40 solids/methocel). Properties of the resulting resin, diluted with 50% by weight styrene, are set forth below:

Resin Properties (50% Styrene)

| 1. | Color, Gardner 4 | |
|---|---|---|
| 2. | Sp. Gr. at 25° C. | 1.050 |
| 3. | Viscosity, Brookfield, Spindle #2 at 20 rpm | 85 cps |
| 4. | Reactivity: (100 gm + 1% DDM-9 Catalyst) | |
| | a. Gel time | 3'0" |
| | b. Peak | 355° F. |
| | c. Cure | 4'24" |
| | d. Total | 7'24" |

The resin was formulated and emulsified in accordance with procedures described in Example B. Properties of the resulting emulsion are set forth below.

Resin Emulsion Properties

| 1. | Viscosity, Brookfield at 25° C., Spindle #2 at 20 rpm | 1380 cps |
|---|---|---|
| 2. | Reactivity (100 gms resin + 1% DDM-9) | |
| | a. Gel time | 12'42" |
| | b. Peak | 160° F. |
| | c. Cure | 14'0" |
| | d. Total | 26'42" |

EXAMPLE F

In this example, a conventional polyester was formed from the following components:

| 1. | Isophthallic acid | 1.0 mole |
|---|---|---|
| 2. | Diethylene glycol | 3.05 moles |
| 3. | Maleic anhydride | 2.0 moles |

These components were allowed to react together at elevated temperature until the acid number of the reaction mixture was less than 20 and the viscosity measured T-U (60/40 solids/methocel). This conventional resin was formulated and emulsified in accordance with Example B; the properties of the polymer dissolved in 50% by weight styrene are described below:

Resin Properties (50% Styrene)

| 1. | Color | Gardner 3 |
|---|---|---|
| 2. | Sp. Gr. 25 25° C. | |
| 3. | Viscosity, Brookfield, Spindle #2 at 20 rpm | 88 cps |
| 4. | Reactivity (100 gms + 1% DDM-9 catalyst) | |
| | a. Gel time | 3'5" |
| | b. Peak | 410° C. |
| | c. Cure | 3'45" |
| | d. Total | 6'50" |

An emulsion prepared from this conventional resin and formulated in accordance with Example B broke soon after forming, and, thus, its properties could not be determined. It is noted that the cook procedure for this conventional resin involved a two-stage process. In the first stage, elevated temperature and pressure without catalyst were employed in the absence of maleic anhydride. The second stage involved the addition of the maleic anhydride, after the isophthallic had been reacted and the cook cooled below 180° C. The cook was completed at 210°–220° C.

EXAMPLE G

Emulsion Stability Testing

Procedure

The resin was cut to 50% styrene. To 200 parts of the resin, 200 parts of distilled water was added. The whole was blended for 1 min. in a Waring blender. The mix was allowed to sit at room temperature until the emulsion broke.

| Emulsion of resin prepared by | Time to emulsion breaking |
|---|---|
| Method 1 | 3 hrs. 50 min. |
| Method 5 | 3 hrs. 30 min. |
| Method 7 | 4 hrs. 15 min. |
| Example E | 20 min. |
| Example F | 5 min. |

These results are substantially constant with previous tests, although the emulsion based on Example E was longer-lived in the previous test.

In the experiments described below, the properties of cured products made from emulsions of the invention were measured. Laminates and castings were made from the emulsions, and their properties were measured. The emulsion formulation was varied and the properties of cured products made from the various formulations were measured.

In Tables I and II below the effect of varying the proportions of each component of the emulsions of the invention on the physical properties of cured products produced from the emulsions are described.

TABLE I

Effect of Emulsion* Formulation on Physical Properties of Laminates

| Formulation Resin/H$_2$O/Al.3H$_2$O | 33%/33%/33% | 44%/44%/12% | 50%/50%/00% |
|---|---|---|---|
| Percent Glass (Final Cure) | 20.1(15) | 22.4(06) | 32.0(09) |
| Percent Al.3H$_2$O (Final Cure) | 21.8 | 10.4 | 00.0 |
| Flexural Strength ASTM #D-790 (PSI × 10$^{-3}$) | 10.1(09) | 12.0(12) | 11.7(12) |
| Flexural Modulus ASTM #D-790 (PSI × 10$^{-5}$) | 3.6(04) | 4.6(06) | 3.0(03) |
| Compressive Strength ASTM #D-695 (PSI × 10$^{-3}$) | 7.6(04) | 5.7(15) | 3.4(08) |
| Compressive Modulus ASTM #D-695 (PSI × 10$^{-5}$) | 6.5(02) | 5.5(14) | 10.6(16) |
| Tensile Strength ASTM #D-638 | 5.0(07) | 8.4(07) | 8.3(17) |

TABLE I-continued

Effect of Emulsion* Formulation on
Physical Properties of Laminates

| (PSI × $10^{-3}$) | | | |
|---|---|---|---|
| Elongation<br>ASTM #D-638<br>% | 1.10(17) | 1.55(51) | 1.28(35) |
| IZOD Impact Strength<br>ASTM #D-256<br>(Ft-Lbs/Inch) | 11.5(10) | 12.4(09) | 15.2(04) |
| Water Absorption<br>ASTM #D-570<br>% | 8.0(27) | 9.0(08) | 16.7(05) |

*Polyester resin produced by Method 5 above.

TABLE II

Effect of Emulsion* Formulation on
Physical Properties of Castings

| Formulation<br>Resin/H$_2$O/Al.3H$_2$O | 33%/33%/<br>33% | 44%/44%/<br>12% | 50%/50%/<br>00% |
|---|---|---|---|
| Percent Glass<br>(Final Cure) | 00.0 | 00.0 | 00.0 |
| Percent Al.3H$_2$O<br>(Final Cure) | ND | ND | ND |
| Flexural Strength<br>ASTM #D-790<br>(PSI × $10^{-3}$) | 3.3(02) | 2.8(02) | 3.8(02) |
| Flexural Modulus<br>ASTM #D-790<br>(PSI × $10^{-5}$) | 2.5(01) | 1.8(01) | 1.3(01) |
| Compressive Strength<br>ASTM #D-695<br>(PSI × $10^{-3}$) | 3.3(03) | 2.3(03) | 2.5(01) |
| Compressive Modulus<br>ASTM #D-695<br>(PSI × $10^{-5}$) | 2.9(10) | 1.4(02) | 1.3(01) |
| Tensile Strength<br>ASTM #D-638<br>(PSI × $10^{-3}$) | 1.66(14) | 1.26(05) | 1.68(17) |
| Elongation<br>ASTM #D-638<br>(%) | 0.75(11) | 0.67(04) | 1.51(37) |
| IZOD Impact Strength<br>ASTM #D-256<br>(Ft-Lbs/Inch) | 0.55(09) | 0.37(06) | 0.61(04) |
| Water Absorption<br>ASTM #D-570<br>(%) | 4.21(19) | ND | 9.06(71) |

ND = Not Determined
*Polyester resin produced by Method 5 above.

The unfilled emulsions and emulsions filled with Al.3H$_2$O which were described above in Tables I and II and in tables below were prepared by placing the resin in a waring-brand blender and then added water slowly, followed by stirring for about 2 minutes. These steps were undertaken at about 75° F. Filler was added, except to the unfilled emulsion, after the emulsion was stirred for 2 minutes; and then the emulsion with filler was stirred for an additional 2 minutes.

The laminates were prepared by adding a catalyst (Norac MEKP9) in an amount of 1 weight percent, based on the weight of the filled emulsion. Gel times of the emulsions was fixed at 3 to 5 minutes by small additions of m-tert-butyl hydroquinone inhibitor or of dimethylaniline promotor, as necessary. Two 1½ oz. glass plies were used as reinforcement; they were handrolled onto acrylic backing. The laminates and castings were cured at room temperature for 10 hours.

From the results in Tables I and II, it is noted that there is very little difference in physical properties between the various filled and unfilled systems. Although glass is used as physical property reinforcement, it is noted that glass contents over about 20% do not measurably improve physical properties of the resulting laminates.

Resins of emulsions of the invention will air cure at ambient temperature. The effect of air cure on the resulting properties of laminates produced using the resin emulsions are set forth below in Table III. Those results are compared to properties of laminates produced using air cure and heat treatment, also in Table III below.

TABLE III

Effect of Post Curing on the Physical Properties of
Resin* Emulsion in Laminates

| Laminate Cure<br>Treatment | 10 Days at<br>Room Temp.<br>(No Post Cure) | 10 Days at<br>Room Temp.<br>(6 hrs. at 50° C.) |
|---|---|---|
| Percent Glass<br>(Final Cure) | 20.1(15) | 23.3 |
| Percent Al.3H$_2$O<br>(Final Cure) | 21.8 | 21.2 |
| Flexural Strength<br>ASTM #D-790<br>(PSI × $10^{-3}$) | 10.1(09) | 13.7(07) |
| Flexural Modulus<br>ASTM #D-790<br>(PSI × $10^{-5}$) | 3.6(04) | 5.2(03) |
| Compressive Strength<br>ASTM #D-695<br>(PSI × $10^{-3}$) | 7.6(04) | 4.1(12) |
| Compressive Modulus<br>ASTM #D-695<br>(PSI × $10^{-5}$) | 6.5(03) | 8.6(12) |
| Tensile Strength<br>ASTM #D-638<br>(PSI × $10^{-3}$) | 5.0(07) | 6.6(03) |
| Elongation<br>ASTM #D-638<br>(%) | 1.10(17) | 1.35(10) |
| IZOD Impact Strength<br>ASTM #D-256<br>(Ft-Lbs/Inch) | 11.5(10) | 13.5(16) |
| Water Absorption<br>ASTM #D-570<br>(%) | 8.0(27) | 7.1(02) |

*Polyester resin produced by Method 5 above.

The post curing heat treatment appeared to improve every physical property except possibly the property of compressive strength.

In Table IV below, the physical properties of emulsions of the invention are compared to physical properties of conventional polyester emulsion.

TABLE IV

Comparison of the Physical Properties of Different
Resin Products Using the 44% Resin/44% H$_2$O/12%
Al.3H$_2$O Formulation

| Product<br>Identification | Resin Emulsion<br>of Invention* | Ashland<br>667P | Reichhold<br>32-182 |
|---|---|---|---|
| Percent Glass<br>(Final Cure) | 22.4(06) | 23.0(06) | 24.5(11) |
| Percent Al.3H$_2$O<br>(Final Cure) | 10.4 | ND | ND |
| Flexural Strength<br>ASTM #D-790<br>(PSI × $10^{-3}$) | 12.0(12) | 9.6(12) | 11.2(10) |
| Flexural Modulus<br>ASTM #D-790<br>(PSI × $10^{-5}$) | 4.6(06) | 4.0(03) | 4.2(07) |
| Compressive Strength<br>ASTM #D-695<br>(PSI × $10^{-3}$) | 5.7(15) | 3.5(06) | 3.5(08) |
| Compressive Modulus<br>ASTM #D-695<br>(PSI × $10^{-5}$) | 5.5(14) | 8.5(16) | 4.9(05) |
| Tensile Strength<br>ASTM #D-638<br>(PSI × $10^{-3}$) | 8.4(07) | 6.9(11) | 6.5(08) |
| Elongation | 1.55(51) | 1.41(09) | 1.38(28) |

TABLE IV-continued

Comparison of the Physical Properties of Different Resin Products Using the 44% Resin/44% H2O/12% Al.3H2O Formulation

| Product Identification | Resin Emulsion of Invention* | Ashland 667P | Reichhold 32-182 |
|---|---|---|---|
| ASTM #D-638 (%) | | | |
| IZOD Impact Strength ASTM #D-256 (Ft-Lbs/Inch) | 12.4(09) | 11.3(11) | 9.9(08) |
| Water Absorption ASTM #D-570 (%) | 9.0(09) | 5.6(12) | 16.8(11) |

ND = Not Determined
*A polyester resin prepared by Method 5 above.

The Ashland polyester is an isophthalic propylene glycol polyester. Properties of laminates produced from emulsions of the invention generally exhibit superior strengths. Linear shrink values, determined by ASTM Test D-2566, for two unfilled emulsions containing a resin to water ratio of 50:50, were measured.

| Resin Source | Linear Shrink Value |
|---|---|
| Resin produced by Method 5 | $5.8 \times 10^{-3}$ inches/inch |
| Ashland 667-P | $13.0 \times 10^{-3}$ inches/inch |

These linear shrinkage measurements indicate that products produced by emulsions of the invention exhibit surprisingly small dimensional change with little water loss compared to products produced by conventional polyester emulsions. This property is significant with respect to molding and casting. Linear shrinkage causes distortion of the molded article, as water leaves the molded emulsion, especially in warm climates. Distortion of cured molded products such as furniture (as water leaves the emulsion) reveals itself as warpage which can be hazardous, and significantly impairs the usefulness of prior emulsions. The emulsions of the present invention, which exhibit low linear shrinkage, are thus a significant improvement over these prior emulsions.

In Table 5, adhesive bond strength of laminates produced using emulsions of the invention proved to be much greater than those of laminates produced by a conventional polyester emulsion.

TABLE V

Representative Values Obtained for Various Formulations With ASTM Method 'C-297' to Test Adhesive/Interlaminate/Cohesive Bonding Strengths for Sandwich Constructions in a Flatwise Plane

| Formulation % Resin/ % H2O/% Al.3H2O | Bond Strength (1) (PSI) | Type of Failure |
|---|---|---|
| Invention* Laminate (2) 33/33/33 | 758. | Interlaminate (3) |
| Invention* Laminate 44/44/12 | 685. (4) | Interlaminate |
| Invention* Laminate 50/50/00 | 889. | Interlaminate |
| Ashland 667-P Laminate 44/44/12 | 348. | Cohesion |
| Invention* Casting 33/33/33 | 927. | Cohesion |
| Invention* Casting 44/44/12 | 1158. | Cohesion |
| Invention* Casting 50/50/00 | 1145. | Cohesion |

*A polyester resin prepared by Method 5 above.
(1) Bond strengths are the averages of several experimental values.
(2) Laminates were prepared using two 1½ oz. glass plies handrolled onto acrylic backing. Acrylics used were Rhom & Haas "DR'and Swedcast. Combinations of each were used in every test.
(3) Interlaminate failures generally occurred between the glass plies forming the laminate. Cohesion failure is rupture of the emulsion casting under vertical tensile force. It corresponds to interlaminar failure, except that the casting is without glass re-inforcement.
(4) This laminate was cured 10 days at room temperature. All others were cured one day at room temperature plus 16 hours at 50° C. followed by another day at room temperature.

In the experiments of Table V, the emulsion exhibited excellent adhesion to the acrylic layer. In almost all cases, failure of the laminate due to tensile stress was cohesive or interlaminar, rather than adhesive failure.

It is understood that various other modifications will be apparent to and can readily be made by those skilled in the art without departing from the scope and spirit of this invention. Accordingly, it is not intended that the scope of the claims appended hereto be limited by the description above, but rather that the claims be construed as encompassing all the patentable features which reside in the present invention, including all features which would be treated as equivalents thereof by those skilled in the art to which this invention pertains.

What is claimed is:

1. An aqueous polyester emulsion, said emulsion comprising at least about 20% by weight of a polyester and up to about 80% by weight water,
    said polyester formed from dicyclopentadiene, maleic acid and a compound containing at least two alcoholic hydroxy groups, said dicyclopentadiene being present in a molar ratio of at least about 1 compared to said maleic acid.

2. The emulsion of claim 1, wherein said alcoholic hydroxy compound is diethylene glycol.

3. The emulsion of claim 1, wherein the polyester has a molecular weight of up to about 1200.

4. The emulsion of claim 1, wherein the polyester has a molecular weight up to about 1500.

5. The emulsion of claim 1, wherein the polyester has a molecular weight up to about 2000.

6. The emulsion of claim 1, wherein the polyester has a molecular weight up to about 3000.

7. The emulsion of claim 1, including a filler.

8. The emulsion of claim 1, wherein said emulsion comprises about 50% by weight of polyester and about 50% by weight of water.

9. The emulsion of claim 7, wherein said emulsion comprises about 33% by weight of polyester, about 33% by weight of water, and about 33% by weight of filler.

10. The emulsion of claim 7, wherein said emulsion comprises about 44% by weight of polyester, about 44% by weight of water, and about 12% by weight of filler.

* * * * *